US012072011B2

United States Patent
Cariccia et al.

(10) Patent No.: US 12,072,011 B2
(45) Date of Patent: Aug. 27, 2024

(54) FILTERING PULLEY

(71) Applicant: DAYCO EUROPE S.R.L., Chieti (IT)

(72) Inventors: Gianluca Cariccia, Chieti (IT); Andrea Guala, Chieti (IT); Federico Domenico Licata, Chieti (IT); Marco Cipelli, Chieti (IT); Markus Armbrust, Chieti (IT); Gregorio Luciani, Chieti (IT)

(73) Assignee: DAYCO EUROPE S.R.L., Chieti (IT)

( * ) Notice: Subject to any disclaimer, the term of this patent is extended or adjusted under 35 U.S.C. 154(b) by 139 days.

(21) Appl. No.: 17/997,249

(22) PCT Filed: Apr. 28, 2021

(86) PCT No.: PCT/IB2021/053532
§ 371 (c)(1),
(2) Date: Oct. 27, 2022

(87) PCT Pub. No.: WO2021/220193
PCT Pub. Date: Nov. 4, 2021

(65) Prior Publication Data
US 2023/0167892 A1 Jun. 1, 2023

(30) Foreign Application Priority Data
Apr. 28, 2020 (IT) .......................... 102020000009289

(51) Int. Cl.
*F16H 55/36* (2006.01)
*B60K 6/48* (2007.10)
(Continued)

(52) U.S. Cl.
CPC .......... *F16H 55/36* (2013.01); *F16D 27/118* (2013.01); *F16F 15/123* (2013.01); *B60K 6/48* (2013.01);
(Continued)

(58) Field of Classification Search
CPC ............... F16H 55/36; F16H 2055/306; F16H 2055/366; F16H 2055/363; F16D 27/12; F16F 15/123
(Continued)

(56) References Cited

U.S. PATENT DOCUMENTS 4,004,335 A * 1/1977 Pierce .................. B21D 53/261
474/171
7,121,947 B2 * 10/2006 Ueda ....................... F16D 7/024
464/10

(Continued)

OTHER PUBLICATIONS

PCT/IB2021/053532, International Search Report and Written Opinion, Oct. 28, 2021 (16 pages).

*Primary Examiner* — Henry Y Liu
(74) *Attorney, Agent, or Firm* — FisherBroyles, LLP; Susan M. Oiler

(57) ABSTRACT

A filtering pulley has a hub configured to be fixed to a shaft for rotation thereabout, a crown mounted coaxial and rotationally free on the hub, and a plurality of elastic groups arranged circumferentially with respect to the hub and to the crown and interposed, each, between a pair of first elements integral with the hub and between a pair of second elements integral with the crown. The first elements have at least two spokes, carried by an actuator that is made of two portions that are selectively geared between them to selectively connect the crown to the hub.

16 Claims, 6 Drawing Sheets

(51) Int. Cl.
*F16D 27/118* (2006.01)
*F16F 15/123* (2006.01)

(52) U.S. Cl.
CPC .. *F16H 2055/363* (2013.01); *F16H 2055/366* (2013.01)

(58) Field of Classification Search
USPC .......................................................... 474/94
See application file for complete search history.

(56) References Cited

U.S. PATENT DOCUMENTS

| | | | | |
|---|---|---|---|---|
| 8,070,632 B2* | 12/2011 | Yuan | ........................ | F16H 55/14 |
| | | | | 74/411 |
| 8,262,520 B2* | 9/2012 | Shimamura | ............... | F16D 3/12 |
| | | | | 474/94 |
| 11,642,678 B2* | 5/2023 | Fredriksson | ............ | F16H 55/36 |
| | | | | 474/94 |
| 11,732,774 B2* | 8/2023 | Kieran | ...................... | F16H 7/20 |
| | | | | 474/94 |
| 2004/0166944 A1* | 8/2004 | Nosaka | ..................... | F16D 9/08 |
| | | | | 464/32 |
| 2007/0080036 A1* | 4/2007 | Elie | ....................... | F16D 37/008 |
| | | | | 192/84.951 |
| 2010/0234156 A1* | 9/2010 | Riu | ....................... | F16D 27/105 |
| | | | | 474/171 |
| 2012/0149511 A1* | 6/2012 | Hodjat | ................ | F16F 15/1215 |
| | | | | 474/94 |
| 2012/0237361 A1* | 9/2012 | Cochran | ................... | F16D 9/06 |
| | | | | 417/15 |
| 2016/0138699 A1* | 5/2016 | Dell | ...................... | F16F 15/123 |
| | | | | 267/168 |
| 2016/0146328 A1* | 5/2016 | Dell | ...................... | B60K 25/02 |
| | | | | 474/94 |
| 2016/0153519 A1* | 6/2016 | Yoon | ......................... | F16H 7/02 |
| | | | | 474/94 |
| 2016/0201757 A1* | 7/2016 | Tran | ........................ | F02N 11/04 |
| | | | | 474/94 |
| 2016/0298700 A1* | 10/2016 | Bartholomew | ........... | F16H 1/00 |

* cited by examiner

FILTERING PULLEY

CROSS-REFERENCE TO RELATED APPLICATIONS

The present invention is filed under 35 U.S.C. § 371 as the U.S. National Phase of International Patent Application No. PCT/IB2021/053532, filed Apr. 28, 2021, which designated the United States and which claims the benefit of Italian patent application no. 102020000009289, filed on, Apr. 28, 2020, the entire disclosure of which is incorporated herein by reference.

TECHNICAL FIELD

This invention relates to a filtering pulley, preferably a pulley for a crankshaft in an accessory transmission of an internal combustion engine.

STATE OF THE PRIOR ART

As is well known, the drive shaft in internal combustion engines is subject to torsional vibration due to periodic stresses caused by combustion in the cylinders. These vibrations are particularly intense upon start-up and at low engine speeds, as well as in the presence of special design solutions such as the use of dual-clutch gearboxes, start-stop or hybrid systems.

Torsional vibrations result in irregularities in the rotation of the drive pulley of the accessory transmission that are transmitted to the accessories via the transmission belt, which is, therefore, subject to periodic changes in tension.

In order to "filter" the torsional oscillations transmitted from the crankshaft to the belt, a filtering pulley provided with a hub integral with the drive shaft, a crown cooperating with the belt, and one or more elastic elements through which the driving torque is transmitted from the hub to the crown, is generally used as a drive pulley.

Additionally, in hybrid systems, the need is felt to have to decouple the crankshaft from the rest of the transmission. An example of this requirement is given by the use of the air conditioning system, even with the engine off, whose compressor is coupled to the transmission and is driven by one or more electric motor-generators configured to generate torque, instead of absorbing it as usual. In this condition, the inertia of the thermal combustion engine would result in a passive load that therefore tends to reduce the efficiency of the transmission system by consuming energy.

Systems are known that decouple the pulley from the crankshaft of the internal combustion engine when the electric motor is active and the internal combustion engine is not being used.

However, these systems are particularly complex and cumbersome and, therefore, costly. In addition, these systems involve the use of disc clutches that do not enable precise control of the coupling and decoupling of the pulley to the crankshaft. Or there are purely single-direction freewheeling systems.

The purpose of this invention is to produce a filtering pulley that solves the above-mentioned technical problem in a simple and economical way.

SUMMARY OF THE INVENTION

The above-mentioned purpose is achieved with a filtering pulley and a transmission system according to the appended claims.

BRIEF DESCRIPTION OF THE DRAWINGS

In order to better understand this invention, a preferred embodiment thereof will now be described by way of non-limiting example and with reference to the accompanying drawings, in which.

DETAILED DESCRIPTION OF THE INVENTION

Figure 1:
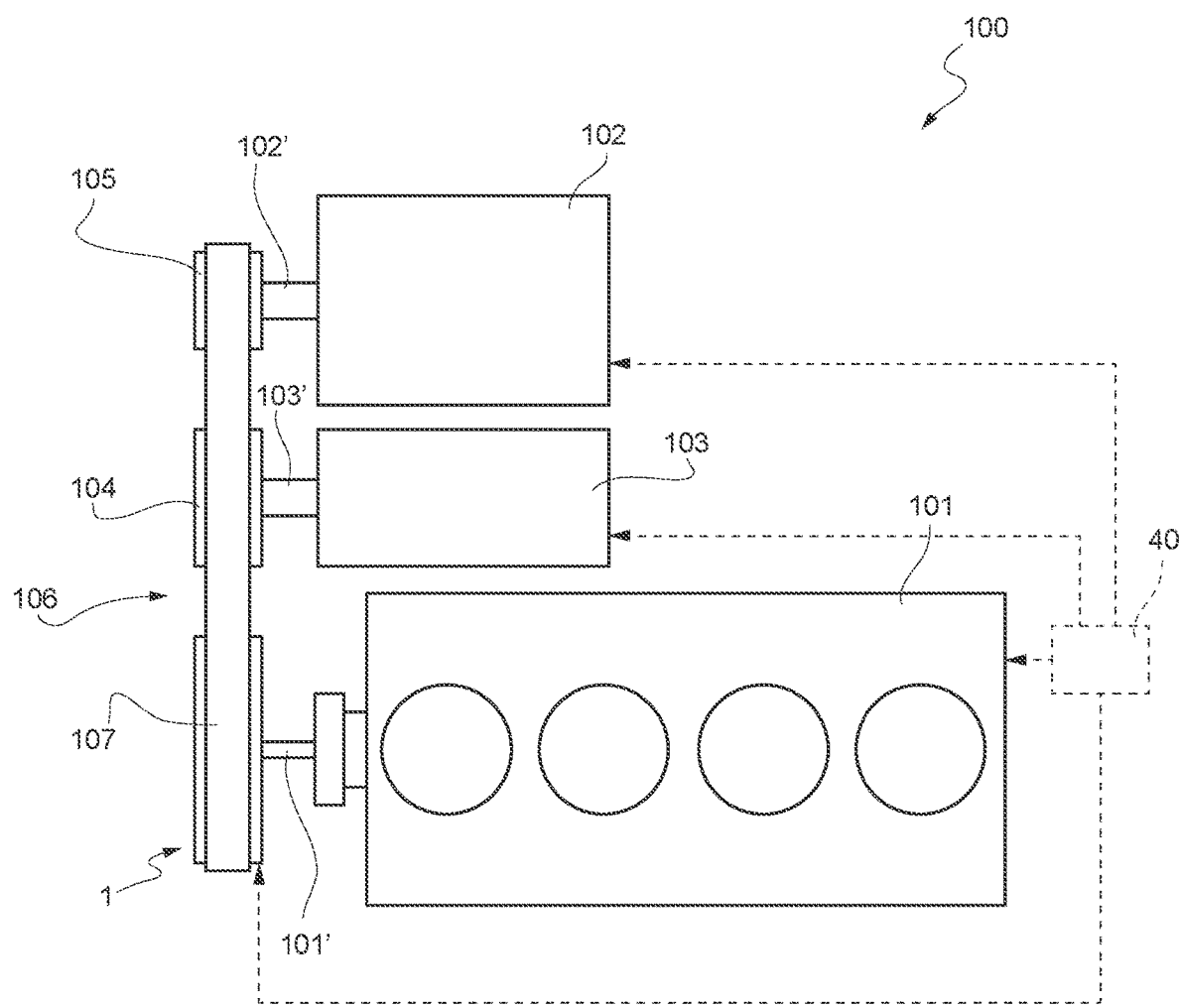
FIG. 1 is a schematic representation of a transmission system according to one aspect of this invention.

FIG. 1 depicts a transmission system 100 of a vehicle essentially comprising an internal combustion engine 101, at least one electric motor/generator 102, and at least one accessory element 103, such as, for example, a compressor of a vehicle air conditioning circuit or a water pump.

Each of the internal combustion engine 101, the electric motor/generator 102, and the accessory element 103 comprises a corresponding shaft 101', 102', 103' to which a pulley is coupled, in particular a pulley 1 according to the invention for the internal combustion engine 101, and corresponding pulleys 104, 105, for example known ones, for the electric motor/generator 102 and the accessory element 103.

The transmission system 100 comprises an endless transmission element 106, for example a belt 107, preferably a poly-V or toothed belt, configured to cooperate with the pulleys 1, 104, and 105 to allow transmission of torque between the internal combustion engine 101, the electric motor 102, and the accessory element 103, which is known.

Figure 2:
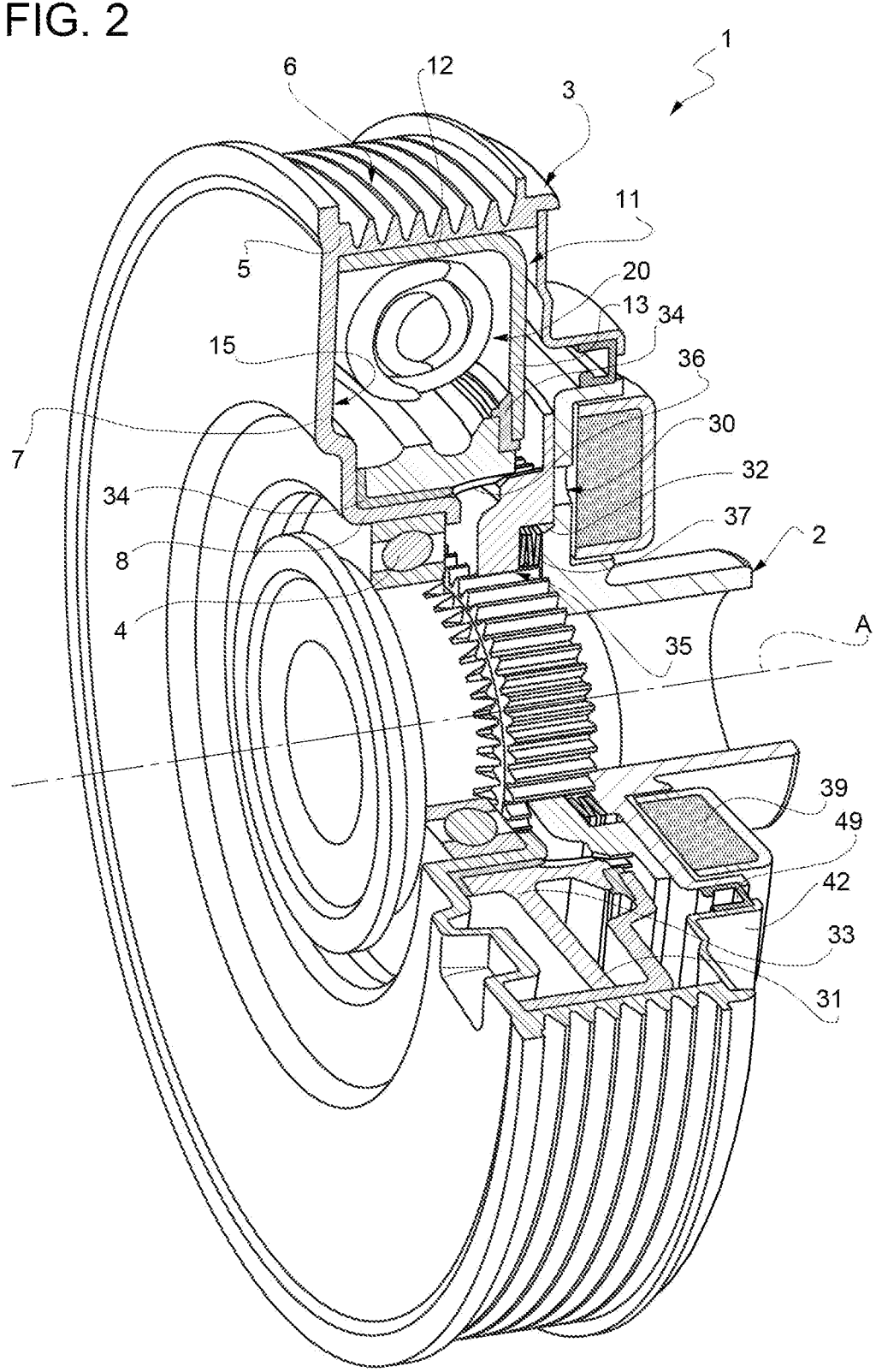
FIG. 2 is a perspective and partially sectioned view of a pulley according to the invention with parts removed for clarity.
Figure 3:
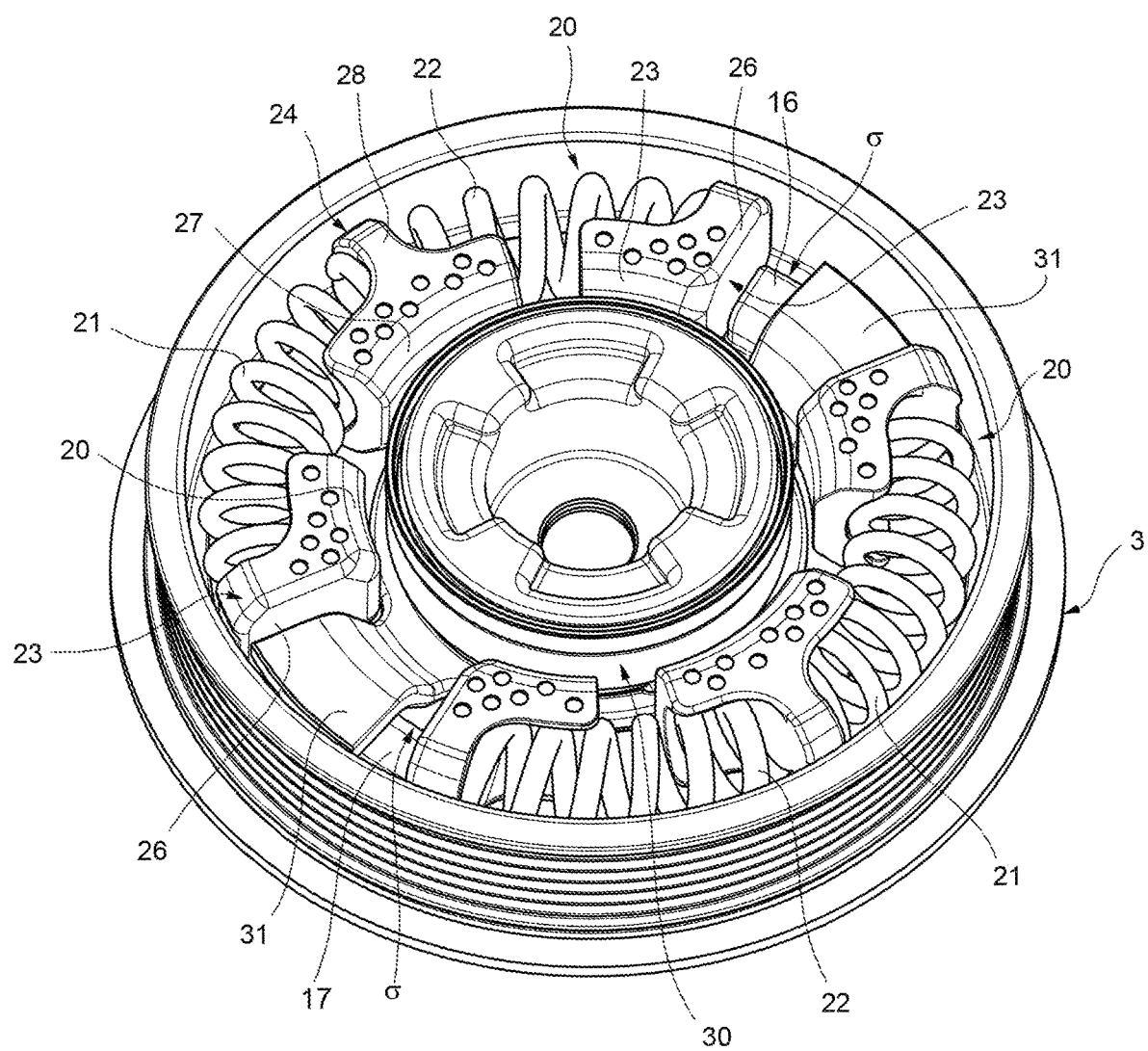
FIG. 3 is a perspective view, with parts removed for clarity, of a portion of the pulley in FIG. 2.
Figure 4:
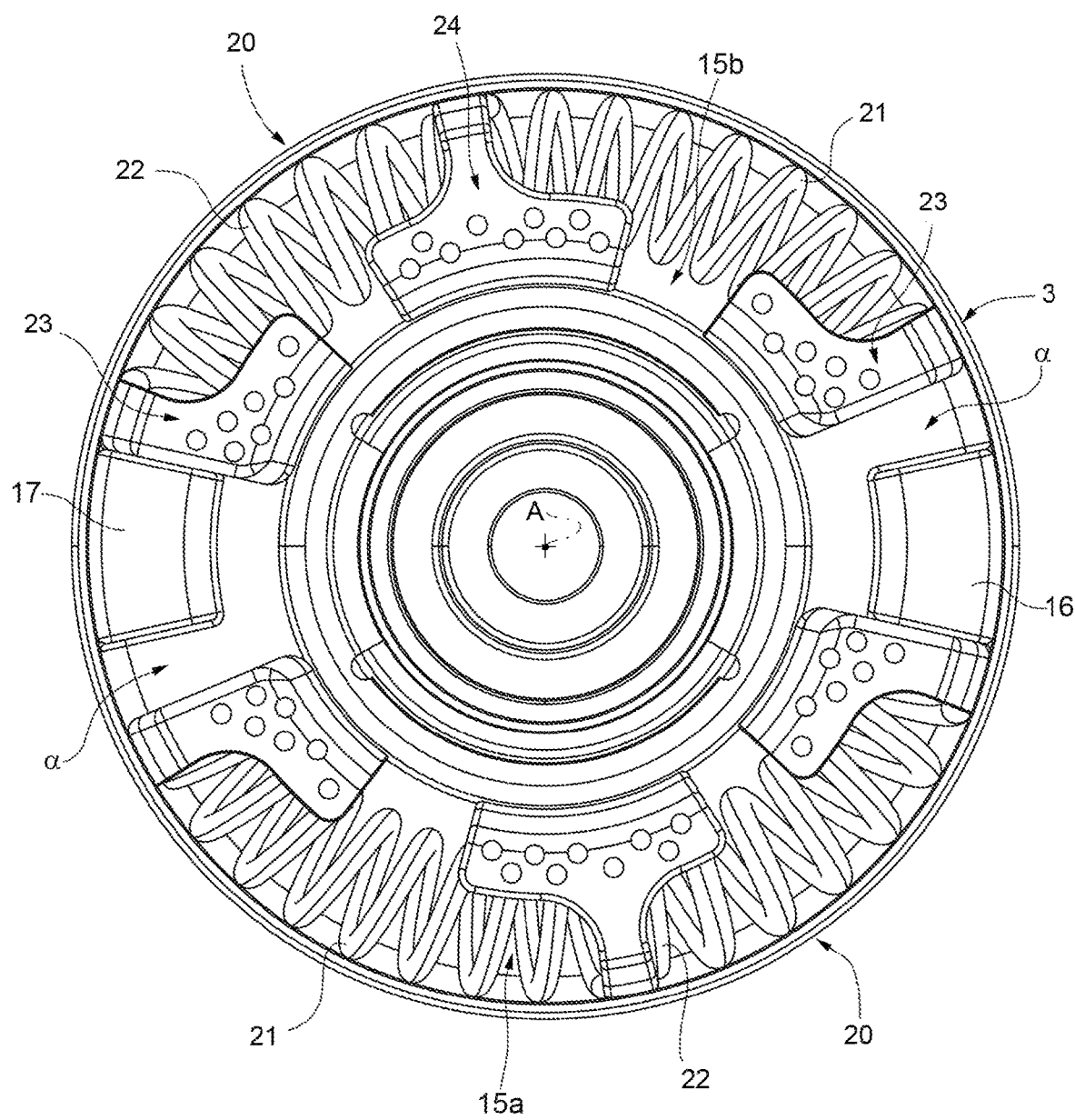
FIG. 4 is a front view of the pulley in FIG. 1, with some parts removed for clarity.

FIGS. 2 to 4 show a filtering pulley 1 comprising a hub 2 of axis A, designed to be connected to the shaft 101', i.e. to the crankshaft of the internal combustion engine 101, and an annular crown 3 externally coaxial to the hub 2 and rotationally freely supported on the hub 2 with rolling means 4 such as a bearing, preferably a rolling bearing.

The crown 3 comprises an annular portion 5 provided with a profile 6 designed to cooperate with a poly-V belt (not shown). The crown 3 also comprises a radial wall 7, integral with the annular portion 5 and preferably of one piece with it, extending radially towards the hub 2, and a basically cylindrical inner wall 8 of axis A.

The crown 3 carries, integral thereto, a closure element 11 comprising an outer cylindrical wall 12 of axis A and a flat radial annular wall 13 extending radially and cantilevered from the wall 12 towards the axis A.

The closure element 11 is planted in the crown 3 so as to form an annular chamber 15 radially interposed between one wall 12 and another wall 8 and axially bounded by one wall 7 and another wall 13. Finally, the closure element 11 comprises two diametrically opposed projections 16, 17 extending axially within the chamber 15 from the wall 13.

The wall 7 of the crown 3 forms projections (not illustrated) corresponding to and facing the projections 16, 17 of the closure element 11.

The pulley 1 may also be provided with a dynamic damper, of a known type and not illustrated, integral with the hub 2 and not described for brevity. In addition, the pulley 1 comprises multiple, for example two, arched elastic groups 20 circumferentially arranged free in the corresponding portions 15a, 15b of the chamber 15 bounded by the projections 16 and 17. The stroke of the elastic groups 20 in the corresponding portions 15a, 15b is given by an angular play α between each of the elastic groups 20 arranged in contact with one of the projections 16, 17 and the other projection 17, 16.

Each of the elastic groups 20 preferably comprises a pair of arched coil springs 21, 22 advantageously, but not necessarily, placed in series with each other.

Even more preferably, each elastic group 20 is mounted between respective end pads 23 and, optionally, an intermediate pad 24.

If there are two springs 21, 22, they have different stiffnesses, more precisely greater and lesser as will be better described below.

The pads 23 preferably each comprise an arched portion 25 internally surrounding an end portion of the corresponding spring 21, 22, and a head 26 defining an axial support for this end portion. The pad 24 comprises an arched portion 27 that internally surrounds respective opposite end portions of the springs 21, 22 and an intermediate radial baffle 48 between the two springs 21, 22.

Finally, the pulley 1 comprises an actuator 30 carried by the hub 2, as described below. The actuator 30 has two spokes 31 that are free to move circumferentially in the chamber 15 and are designed to interact with the elastic groups 20. Assuming that the actuator 30 is arranged so that each of the spokes 31 is angularly equidistant in relation to the elastic groups 20, the angle between each of the spokes 31 and each of the elastic groups 20 will be equal to σ/2, where σ represents the total angular play between the spokes 31 and the elastic groups 20.

Thus, the hub 2 and the crown 3 can rotate with respect to each other without any torque transmission for an angular range, or free angle, equal to the sum of the angular plays α and σ described above.

Figure 5:
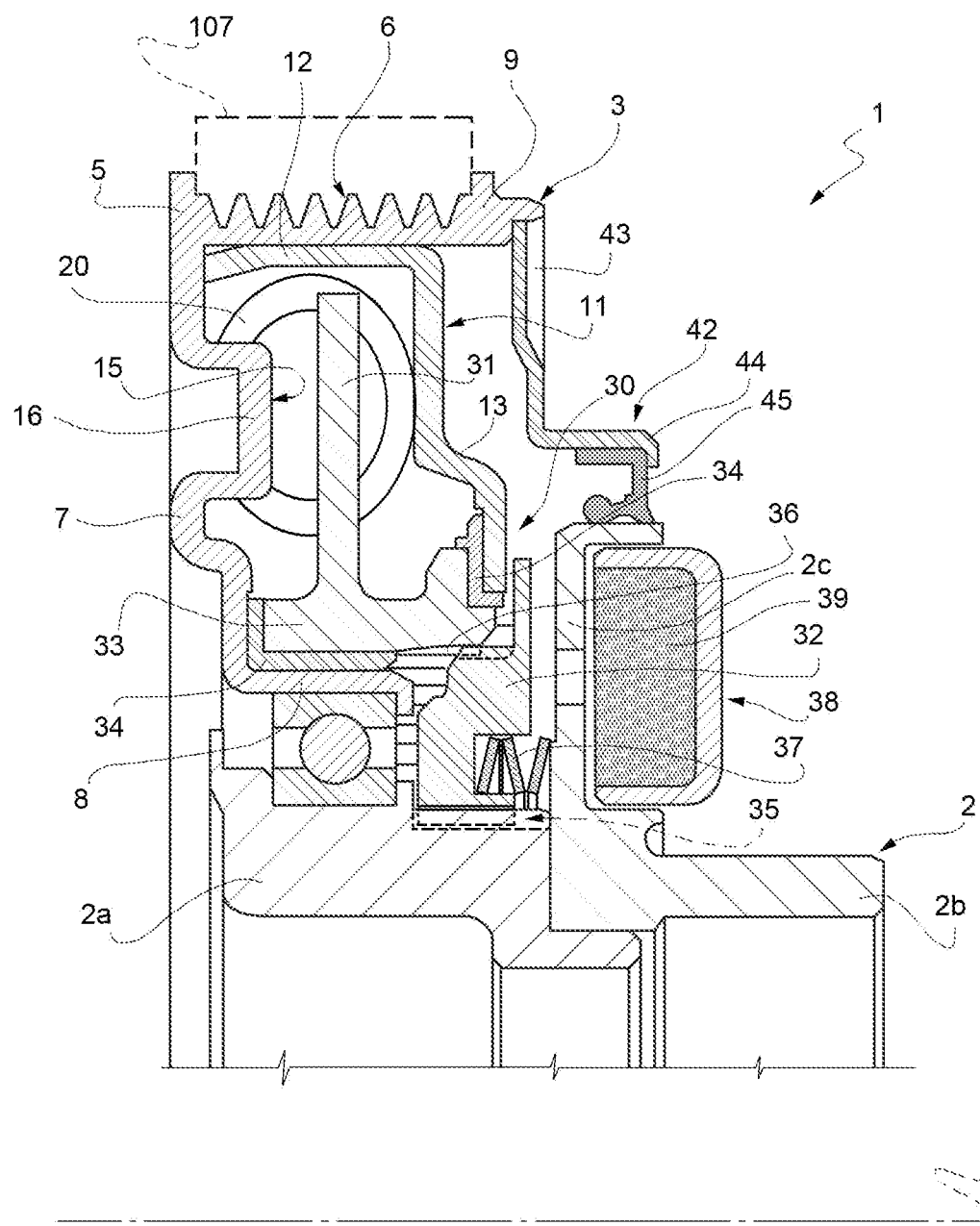
FIG. 5 is a diameter cross-section view of a portion of the pulley according to the invention in a first operating condition.
Figure 6:
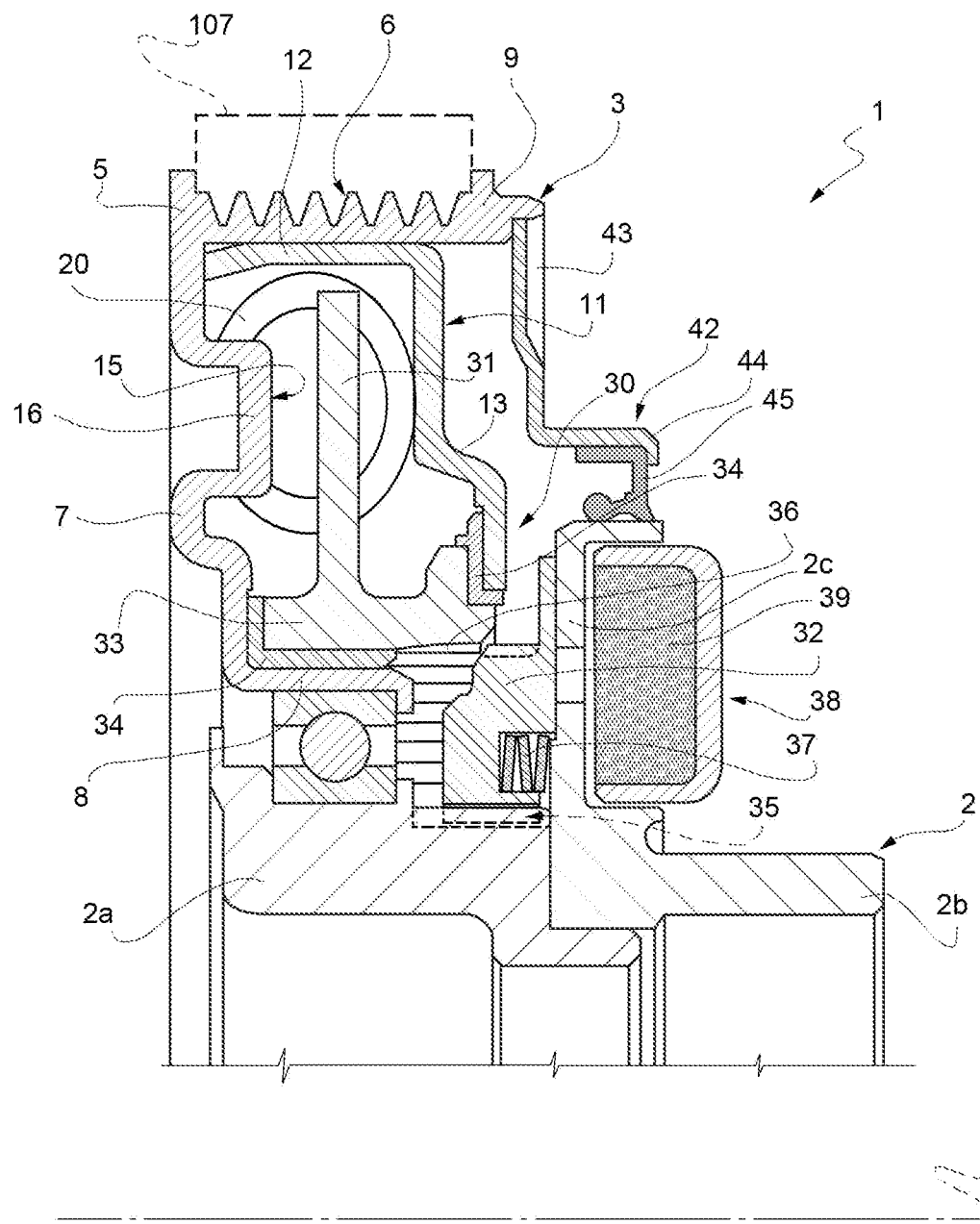
FIG. 6 is a diameter cross-section view of a portion of the pulley according to the invention in a first operating condition.

Furthermore, as can be seen in FIGS. 5 and 6, the spokes 31 are placed radially coincident with the rolling means 4 and also advantageously coincident with the centreline of the portion 6, in order to minimise tilting torques in the pulley 1.

According to one aspect of the invention, the actuator 30 comprises a coupling portion 32 carried by the hub 2 and an actuation portion 33 carrying the above-mentioned spokes 31. The coupling portion 32 and the actuation portion 33 are configured so that they can be selectively coupled so that, in a first operating condition, the coupling portion 32, driven by the hub 2, is integrally coupled to the actuation portion 33 so that the latter is also driven by the hub and so that, in a second operating condition, the coupling portion 32 is operationally separated from the actuation portion 33 so that the actuation portion 33 cannot transmit torque with respect to the hub 2.

Advantageously, the coupling portion 32 is configured to move with respect to the hub 2 along the axis A but fixed with respect to rotation with respect to the latter while the actuation portion 33 is configured to be carried rotationally free from the crown 3 around the axis A but fixed with respect to translation along the latter.

The actuation portion 33 is, preferably, basically annular in shape, thus defining an outer surface from which the spokes 31 project and an inner surface having a larger diameter than the wall 8 so as to radially surround it.

Consistent with the described embodiment, the actuation portion 33 is rotationally freely supported, at least radially, by one wall 8 and, at least axially, by another wall 13. Such rotationally free support is advantageously achieved by means of corresponding support means 34 such as rotating plastic support bushings or rings, interposed between the actuation portion 33 and one wall 8 and between the actuation portion 33 and another wall 13, respectively.

Advantageously, the coupling portion 32 is free to move on the hub 2 by means of a grooved coupling 35 made between the hub 2 and the coupling portion 32. The latter preferably has a basically annular shape about the axis A, the inner diameter of which is of such a size that it externally surrounds the hub 2.

The grooved coupling 35 is therefore made between an inner surface of the coupling portion 32 and an outer surface of the hub 2 so that a number of teeth extending from either the coupling portion 32 or the hub cooperate with respective seats made in the other of the latter. In the described embodiment, the hub 2 defines the number of teeth while the coupling portion 32 defines the number of seats within which the teeth may cooperate.

According to one aspect of the invention, the coupling portion 32 and the actuation portion 33 selectively cooperate by means of a shape coupling that can be geared in a first condition in which the coupling portion 32 is placed at a minimum distance relative to the axial position of the spokes 31 and cannot gear in a second condition in which the coupling portion 32 is placed at a maximum distance relative to the axial position of the spokes 31.

Advantageously, but not necessarily, the shape coupling is a grooved coupling 36 made between the coupling portion 32 and the actuation portion 33. In the case described, the former defines a number of teeth that can be selectively geared with corresponding seats made in the latter. Preferably, the teeth are angularly equidistant to each other according to their number around the axis A, as are the corresponding seats. In addition, the teeth or coupling elements can be made with sides of a fixed shape in order to optimise engagement, for example by means of teeth with a prismatic cross-section.

The coupling portion 32 is kept in the first condition by a force imparted by elastic means 37, preferably axially interposed between the hub 2 and the coupling portion 32. These elastic means may, advantageously, comprise a Belleville washer.

The coupling portion 32 is actuated in its movement along the axis A on the hub 2 by actuating means 38 configured to impart a greater force than that exerted by the elastic means 37.

These actuating means 38 preferably comprise magnetic attraction means such as an electromagnet 39 electrically connected to an electrical power source, such as a battery (not shown) or the motor-generator 102. Accordingly, the decoupling portion 32 is made of material that means it is affected by the magnetic field of the electromagnet 39, for example ferromagnetic material.

The actuating means 38 are also electrically connected to an electronic unit 40 configured to control their operation to enable the coupling portion to pass between the two conditions.

The electronic unit 40 may be the vehicle ECU or the internal combustion engine 101 and is electrically connected to the motor/generator 102, to sensors (not shown) configured to detect operational parameters of the internal combustion engine 101, and/or to the element 103.

The electronic unit 40 comprises processing means configured to: detect signals from the elements to which it is electrically connected; process such signals, potentially by storing them or using data previously stored therein; and send control signals for the above-mentioned elements based on the processing mentioned earlier.

The actuating means 38 are advantageously carried by the hub 2, which is preferably made in two portions 2a, 2b rigidly connected to each other, for example one planted on top of the other. According to the illustrated embodiment, the hub portion 2a supports the rolling means 4 and the actuator 30, while the portion 2b is configured to support the actuating means 38.

The portions 2a, 2b of the hub 2 are preferably substantially similar in shape to one another; in addition, the portion 2b comprises a flange 2c extending radially cantilevered from an annular body end edge of the portion 2b. This end edge is the edge cooperating in contact with the portion 2a to enable rigid connection thereof.

According to the configuration described above, the above-mentioned elastic means 37 are advantageously axially interposed between the flange 2c and the coupling portion 32 while the actuating means 38 are always carried by the flange 2c but on the opposite side with respect to the elastic means 37. To this end, the flange 2c defines a seat 41, advantageously annular, configured to accommodate the electromagnet 39, which is also, advantageously, annular.

According to the above-described configuration, therefore, the decoupling portion 32 in the first operating condition described above is placed at a maximum distance with respect to the flange 2c and in the second condition in which the coupling portion 32 is placed at a minimum distance with respect to the flange 2c, in better contact therewith.

In addition, the pulley 1 comprises a cover 42 configured to cooperate in contact between the crown 3 and the hub 2 so as to prevent communication with the outside of the above-mentioned elements. According to the described embodiment, all the functional elements described except the electromagnet 2 are isolated from the external environment by means of the cover 42, so that the oil contained inside the pulley 1 to allow lubrication of the above-mentioned elements does not contaminate/leak to the outside.

Advantageously, the cover 42 is fixed, for example by pressure, on the crown 3 while it is supported, sliding, on the hub 2. In particular, the cover 42 may comprise an annular wall 43 cooperating in contact with the portion 5 of the crown 3 and a cylindrical wall 44 extending cantilevered from the inner radial edge of the annular wall 43 and configured to cooperate, sliding, with the flange 2c of the hub 2. The sliding cooperation can be achieved by means of a rotating sealing ring 45.

The pulley 1 may also comprise a damper configured to dampen relative oscillations between the hub 2 and the crown 3 but not additionally described herein for brevity.

The operation of a pulley 1 according to the invention as described above is as follows.

In the first condition in which the coupling portion 32 is operationally connected to the actuation portion 33, the torque between hub 2 and crown 3 may be transmitted according to different system 100 operation phases. This configuration can be used for normal system operation 100, wherein the internal combustion engine 101 provides torque to the entire system, or hybrid operation, wherein some of the torque is absorbed or additionally provided by the motor/generator 102.

In this configuration, the electromagnet 39 is deactivated and, therefore, the coupling portion 32 is kept in the position where it is operationally connected to the actuation portion 33 by the force of the elastic means 37.

In a first operation phase, called the "driving mode" and constituting the normal pulley 1 operation mode, when the drive shaft 101' is driving the belt 107, the speed of the hub 2 tends to exceed the speed of the crown 3. Therefore, the spokes 31 of the actuator 30, once having exceeded the free angle α constituted, as described above, by the sum of the angular play σ between the spokes 31 and the elastic groups 20 and of the angular travel a of the latter, transmit the torque to the projections 16, 17 with the interposition of the corresponding elastic groups 20 that therefore define a transmission characteristic of the pulley 1.

What has been stated for the driving mode occurs symmetrically in the condition, called "overrunning", in which the speed of the crown 3 tends to exceed the speed of the hub 2.

In the second condition in which the coupling portion 32 is operationally separated from the actuation portion 33, the torque between hub 2 and crown 3 cannot be transmitted. This condition may be useful if it is desired to operate the system 100 in a purely/mainly electric mode in which, i.e., the internal combustion engine 101 is switched off, or idling, and the electric motor/generator 102 provides torque to the system 100.

In this configuration, the electromagnet 39 is activated and, thus, the coupling portion 32 is attracted by the electromagnetic force exerted by the electromagnet 39 so as to overcome the force of the elastic means 37. This force is such that it compresses the elastic means 37 and carries the coupling portion 32 to the position near the flange 2c so as to decouple the grooved coupling 36 and, thus, disconnect from the actuation portion 33.

The control of the actuating means is achieved by means of the electronic unit 40 that processes the data received from the motor/generator 102, the functional element 103, and the internal combustion engine 101 to control the actuating means 38 and, thus, the electromagnet 39.

The advantages of a pulley 1 according to the invention thus become apparent.

By means of the described pulley 1, it is possible to provide for decoupling of the crown 3 with respect to the hub 2, depending on the conditions of the system 100, in a compact, stable, and fast manner.

In fact, the division into two elements coupled by means of shape couplings such as grooved couplings makes it possible to switch between the coupling and decoupling of the crown 3 with the hub 2 in a compact way and without having to add additional elements such as clutches.

Again, control using electromagnetic means is simple, inexpensive, and can be easily controlled using an electronic unit configured to control the entire system 100.

Lastly, it is clear that modifications and variations may be made to the pulley 1 described without departing from the scope of protection defined by the claims.

It is clear that the form of the elements described may vary within the limits of the claims included below. It is also clear that the elastic groups 20, the elastic means 37, the support and damping elements shown can be replaced with devices that have the same function.

Again, it is clear that the actuating means 38 may vary in type as well as the mutual arrangement and coupling of the portions 32, 33 of the actuator 31, with respect to what has been described.

Or, as described, the grooved couplings 35, 36 could be replaced with similar shape couplings.

Again, the actuating means 38 may comprise actuators of different types such as mechanical (screw-type, for example), pneumatic, or hydraulic.

The invention claimed is:

1. A filtering pulley comprising;
   a hub configured to be fixed to a shaft rotating around an axis (A),
   a crown mounted coaxial and rotationally free on said hub,
   a plurality of elastic groups arranged circumferentially with respect to said hub and to said crown and interposed, each, between a pair of first elements integral with said hub and between a pair of second elements integral with said crown, said first elements comprising at least two spokes, carried by an actuator,
   characterized in that said actuator comprises a coupling portion carried slidingly but rotationally fixed with respect to said axis (A) by said hub and an actuation portion defining said spokes and rotationally free but fixed to translation with respect to said axis (A) by said crown, said coupling and actuation portions being configured to define a first configuration in which they cooperate so that said crown is operatively connected to said hub and a second configuration in which they are operatively separated so that said crown is operatively disconnected from said hub.

2. The filtering pulley according to claim 1, wherein said coupling portion is coupled to said hub by means of a shape coupling.

3. The filtering pulley according to claim 1, wherein said coupling portion and said actuation portion define a coupling having a gear shape according to the position of said coupling portion with respect to said hub.

4. The filtering pulley according to claim 2, wherein said shape coupling is a grooved coupling.

5. The filtering pulley according to one of the preceding claim 1, comprising actuation means configured to allow the passage from said first to said second condition of said portions of said actuator.

6. The filtering pulley according to claim 5, wherein said actuation means comprise an electromagnet.

7. The filtering pulley according to claim 1, comprising elastic means configured to exert a force on said coupling portion to keep it in said first operating condition.

8. The filtering pulley according to claim 7, wherein said elastic means are axially interposed between said coupling portion and said hub.

9. The filtering pulley according claim 1, comprising sliding support means for supporting said actuation portion on said crown.

10. The filtering pulley according to claim 5, comprising an electronic unit configured to control said actuation means.

11. The filtering pulley according to claim 1, comprising a cover and rotating support means, said cover comprising an edge cooperating with one between said crown and said hub and a second edge cooperating with said rotating support means interposed between said second edge and the other between said crown and said hub, said cover isolating from the outside said actuator and said groups elastic bands.

12. The filtering pulley according to claim 1, wherein said hub is made in two portions rigidly connected to each other, a first portion being configured to support said crown and said actuation portion and a second portion being configured to support said coupling portion.

13. The filtering pulley according to claim 1, in which each elastic group forms, with said first elements and with said second elements respective angular play ($\sigma$, $\alpha$), said crown and said hub having a free angle ($\beta$) of relative rotation equal to the sum of said angular plays ($\sigma$, $\alpha$).

14. The filtering pulley according to claim 1, characterized in that it comprises a damper configured to dampen the relative oscillations between said hub and said crown.

15. The filtering pulley according to claim 1, characterized in that it comprises a dynamic damper.

16. A transmission system for a vehicle comprising;
    an internal combustion engine and at least one electric motor or electric generator, each of them comprising a respective pulley configured to cooperate with an element of endless transmission for transmitting torque between said internal combustion engine and at least one electric motor or electric generator, at least said pulley of said internal combustion engine being made according to claim 1.

* * * * *